(12) United States Patent
Frazier et al.

(10) Patent No.: US 9,931,906 B2
(45) Date of Patent: Apr. 3, 2018

(54) MACHINE CAB HAVING IMPROVED OPERATOR VISIBILITY

(71) Applicant: Caterpillar Inc., Peoria, IL (US)

(72) Inventors: Brent R Frazier, Morton, IL (US); Alexa Davis, Metamora, IL (US); Jeffrey Zurinski, Oglesby, IL (US)

(73) Assignee: Caterpillar Inc., Peoria, IL (US)

( * ) Notice: Subject to any disclaimer, the term of this patent is extended or adjusted under 35 U.S.C. 154(b) by 11 days.

(21) Appl. No.: 15/050,576

(22) Filed: Feb. 23, 2016

(65) Prior Publication Data

US 2017/0240021 A1  Aug. 24, 2017

(51) Int. Cl.
  *B60H 1/00* (2006.01)
  *B62D 33/06* (2006.01)

(52) U.S. Cl.
  CPC ..... *B60H 1/00378* (2013.01); *B60H 1/00564* (2013.01); *B62D 33/0617* (2013.01)

(58) Field of Classification Search
  CPC ............ B60H 1/00378; B60H 1/00564; B62D 33/0617
  See application file for complete search history.

(56) References Cited

U.S. PATENT DOCUMENTS

| 782,968 A | 2/1905 | Kramer |
| 3,279,843 A | 10/1966 | Hafer et al. |
| 7,347,488 B2 | 3/2008 | Hayes et al. |
| 8,702,154 B1 | 4/2014 | Gielda et al. |
| 8,851,555 B2 | 10/2014 | Gielda et al. |
| 8,926,003 B2 | 1/2015 | Gielda et al. |
| 8,998,303 B2 | 4/2015 | Gielda et al. |
| 9,011,220 B2 * | 4/2015 | Mayr ................. B60H 1/00378 296/191 |
| 2007/0024088 A1 | 2/2007 | Mori et al. |
| 2007/0044492 A1 | 3/2007 | Ichikawa et al. |
| 2010/0314908 A1 | 12/2010 | Wood, Jr. et al. |
| 2011/0057479 A1 | 3/2011 | Namura et al. |
| 2015/0321705 A1 | 11/2015 | Komatsu Ltd |

FOREIGN PATENT DOCUMENTS

WO    8202086    6/1982

* cited by examiner

*Primary Examiner* — D Glenn Dayoan
*Assistant Examiner* — Melissa A Black
(74) *Attorney, Agent, or Firm* — James S. Bennin

(57) ABSTRACT

A cab for a machine. The machine has a longitudinal axis extending between a front, and a back opposite to the front. The cab includes a roof and a floor extending generally about the longitudinal axis. A vertical seat index axis extends through intermediate portions of the roof and the floor and is associated with a position of the operator disposed to face the front. The vertical seat index axis intersects perpendicular to the longitudinal axis at an intersection. A plurality of support members are disposed between the roof and the floor, including a rear support member disposed at a rear end of the cab. At least an upper portion of the rear support member is positioned at an angle relative to the intersection at an angle along the longitudinal axis and defines a rear view opening to facilitate rear end visibility of the machine.

20 Claims, 4 Drawing Sheets

MACHINE CAB HAVING IMPROVED OPERATOR VISIBILITY

TECHNICAL FIELD

The present disclosure relates generally to machines cabs. In particular, the present disclosure relates to a support member for a machine cab.

BACKGROUND

Earth working and construction type machines, for example motor graders, wheel loaders, excavators, agricultural tractors, dozers, etc. include a cab from which an operator controls the machine and attached implements. The cab protects the operator from any adverse environment and also protects the operator from injury in case of machine roll over. For efficient and effective operation of the machine, an operator should have unobstructed view of the machine and its surrounding objects and environment, including front, sides and back of the machine. An operator of the machine may need to have an unobstructed rear view of the machine while situated in the operator seat inside the cab. For example, the operator may need to have a view on the backside for moving the machine backwards or for monitoring proper functioning of any part of the machine or any implement mounted on the back portion of the machine.

A cab generally includes a floor, a roof and upright support members that extend between the floor and the roof. The upright support members support the roof of the cab above the floor. The upright support members may be used for mounting various components, for example, an air handling duct or other wirings or conduits. Further, such support members along with other parts of the cab are designed structurally strong to act as a roll over protection system (ROPS). As a result, the bigger dimension of such support members may be detrimental in providing an unobstructed rear view from the operator seat. U.S. Pat. No. 3,279,843 discloses a cab with a pair of diagonal members, a pair of cross-members and a pair of vertical braces forming rear support members for the cab. Such multiple members and braces as a rear support members may fail to provide an unobstructed rear view of the machine from the operator seat inside the cab.

SUMMARY OF THE INVENTION

In one aspect of the present disclosure, a cab for a machine is provided. The machine has a longitudinal axis extending between a front, where an operator of the machine faces, and a back opposite to the front. The cab includes a roof extending generally about the longitudinal axis, and a floor opposite to the roof and extending generally about the longitudinal axis. A vertical seat index axis extends through intermediate portions of the roof and the floor. The vertical seat index axis is associated with a position of the operator disposed to face the front and the vertical seat index axis intersects perpendicular to the longitudinal axis at an intersection. A plurality of support members are disposed between the roof and the floor, the plurality of support members include a rear support member disposed at a rear end of the cab and extending between the roof and the floor. At least an upper portion of the rear support member is positioned at an angle relative to the intersection along the longitudinal axis. The upper portion of the rear support member defines a rear view opening to facilitate rear end visibility of the machine.

In another aspect, a cab for a machine is provided. The machine has a longitudinal axis extending between a front, where an operator of the machine faces, and a back opposite to the front. The cab includes a roof extending generally about the longitudinal axis, and a floor opposite to the roof and extending generally about the longitudinal axis. A vertical seat index axis extends through intermediate portions of the roof and the floor. The vertical seat index axis is associated with a position of the operator disposed to face the front and the vertical seat index axis intersecting perpendicular to the longitudinal axis at an intersection. A plurality of support members are disposed between the roof and the floor. The plurality of support members include a rear support member extending between the roof and the floor and disposed at a rear end of the cab. The rear support member has a hollow cross-section defining an air flow passage for air conditioning inside the cab. At least an upper portion of the rear support member is positioned behind the position of the operator and the upper portion of the rear support member defines a rear view opening to facilitate rear end visibility of the machine.

In a yet another aspect, a machine having a cab is provided. The machine has a longitudinal axis that extends between a front of the machine, where an operator faces, and a back opposite to the front. The cab includes a roof extending generally about the longitudinal axis, and a floor opposite to the roof and extending generally about the longitudinal axis. A vertical seat index axis extends through intermediate portions of the roof and the floor. The vertical seat index axis is associated with a position of the operator disposed to face the front and the vertical seat index axis intersects perpendicular to the longitudinal axis at an intersection. A plurality of support members are disposed between the roof and the floor. The plurality of support members include a rear support member disposed at a rear end of the cab and extending between the roof and the floor. At least an upper portion of the rear support member is positioned at an angle relative to the intersection at approximately 15-25 degrees along the longitudinal axis in both lateral directions. The upper portion of the rear support member defines a rear view opening to facilitate rear end visibility of the machine.

DETAILED DESCRIPTION

Figure 1:
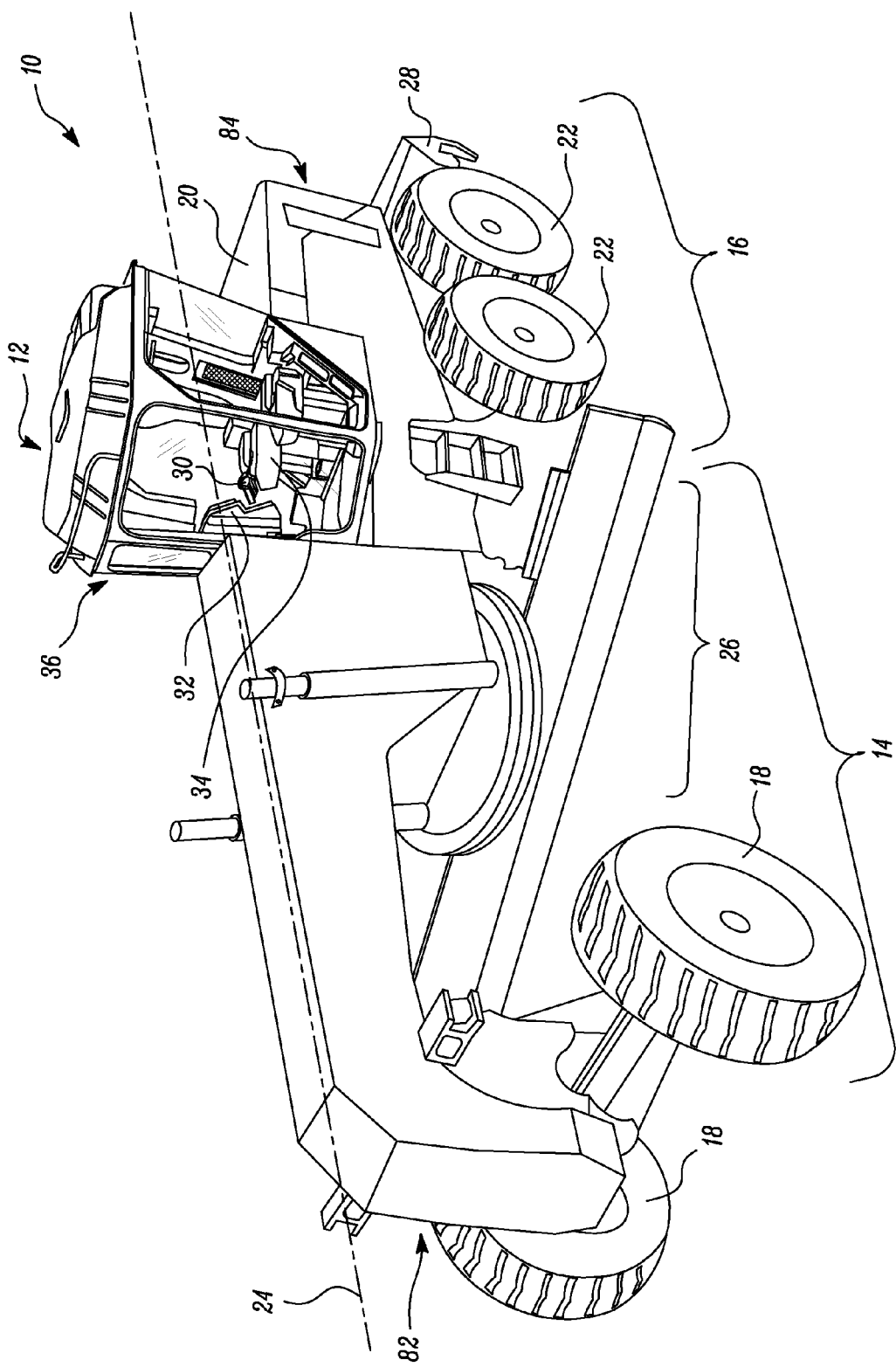
FIG. 1 illustrates a perspective view of a machine in accordance with an embodiment.

FIG. 1 illustrates a machine 10 having a cab 12, from which an operator may control movements of the machine 10. In the depicted example, the machine 10 is a motor grader. However, the machine 10 could alternatively embody another type of earthmoving and/or construction machine, such as an excavator, a wheel loader, an agricultural tractor, a dozer, or another similar machine. The machine 10 may have a front 82 where an operator of the machine 10 faces, and a back 84 opposite to the front 82.

As a motor grader, the machine 10 may include a steerable front frame 14 and a rear frame 16 that is pivotally connected to front frame 14. The front frame 14 may include a pair of front wheels 18. The rear frame 16 may include compartments 20 for housing a power source and associated cooling components. The rear frame 16 may further include rear wheels 22. The rear wheels 22 may be arranged on opposing sides of the rear frame 16. Steering of the machine 10 may be a function of both front wheel steering and articulation of the front frame 14 relative to the rear frame 16. The machine 10 may have a longitudinal axis 24 extending between the front 82 and the back 84 of the machine 10. The longitudinal axis 24 may pass through the operator's general position in the cab 12.

The machine 10 may also include one or more ground engaging tools such as, for example, a drawbar-circle-moldboard (DCM) 26 that is operatively connected to and supported by the front frame 14, and a ripper assembly 28 that is operatively connected to and supported by the rear frame 16. In an embodiment, additional, different, and/or fewer ground engaging tools may be connected to the machine 10.

Figure 2:
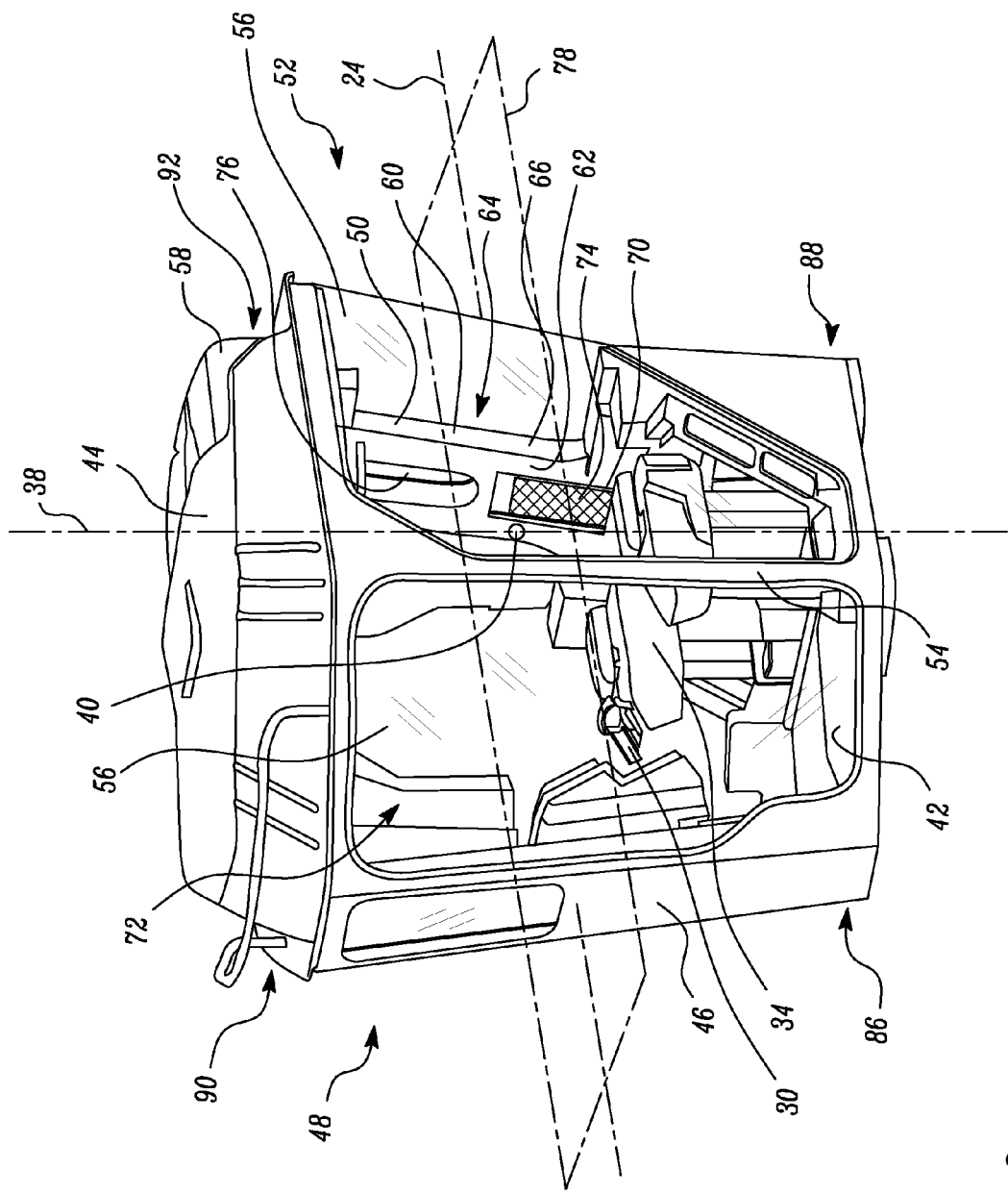
FIG. 2 illustrates a perspective view of a cab in accordance with an embodiment.

Referring to FIG. 2, the cab 12 may house various components configured to monitor or receive input from the operator for operation of the machine 10, or any implement or ground engaging tool mounted on the machine 10. Specifically, the cab 12 may house one or more input devices 30, for example, a joystick. The cab 12 may also include one or more monitoring devices 32, for example a display device. Further, the cab 12 may house a seat 34 for an operator. The operator of the machine 10 may gain access to the cab 12 by way of a door 36 located at either or both sides of the machine 10. One of the doors 36 is removed for clarity.

During operation of the machine 10, the operator may manipulate the input devices 30 from inside the cab 12 to perform various tasks. For example, the operator may position the ripper assembly 28 at a precise location and in a precise orientation in order to create a desired contour at a worksite without causing collision with another portion of the machine 10 and/or with obstacles at the worksite. Similarly, the operator may need to move the machine 10 backward along a precise path. And in order for the operator to make these movements accurately and efficiently, and without damaging the machine 10 or its surroundings, the operator must have a clear rear view of the machine 10, for example of the implements mounted on the back side such as the ripper assembly 28 and its surrounding environment, etc.

FIG. 2 is a simplified illustration of the exemplary cab 12 that provides unobstructed rear view. The cab 12 may include a front end 48, a rear end 52, a floor 42, a roof 44, and a plurality of support members that extend between the floor 42 and the roof 44. The roof 44 may extend between a roof front end 90 and a roof rear end 92. Similarly, the floor 42 may extend between a floor front end 86 and a floor rear end 88. The roof 44 and the floor 42 may extend generally about the longitudinal axis 24 of the machine 10. The support members may consist of a front support member 46 located at a front end 48 of the cab 12 relative to a forward travel direction of the machine 10, a rear support member 50 located at the rear end 52 opposite to the front end 48 of the cab 12, and two middle support members 54 (only one shown) located at opposing sides of cab 12 between the front support member 46 and the rear support member 50. The doors 36 may be mounted between the front support member 46 and the middle support members 54, and windows 56 may be mounted between the middle support members 54 and the rear support member 50. The windows 56 extending from the middle support members 54 to the rear support member 50 may provide for a wide unobstructed view towards back side of the machine. Each of the front support member 46, the rear support member 50, and the middle support members 54 may be oriented vertically or tilted, as desired. For example, the front support member 46, the rear support member 50 and the middle support members 54 may be tilted outward at the roof 44, such that the roof 44 has a larger surface area and overhangs over the floor 42. Further, an air conditioning unit 58 may be mounted on the roof 44 of the cab 12. It may be understood by a person skilled in the art that the air conditioning unit 58 may be mounted on any other location on the machine 10.

A vertical seat index axis 38 is shown that represents a location of the operator's perspective from within the cab 12. The vertical seat index axis 38 may represent a general position of the operator's eyes, with varying height, when the operator is situated in the seat 34. The vertical seat index axis 38 may pass through a location normally occupied by the operator in the seat 34. Specifically, the vertical seat index axis 38 extends through intermediate portions of the roof 44 between the roof front end 90 and the roof rear end 92, and through intermediate portion of the floor 42 between the floor front end 86 and the floor rear end 88. The vertical seat index axis 38 is associated with the position of the operator disposed to face the front end 48. The vertical seat index axis 38 may intersect the longitudinal axis 24 perpendicularly at a point of intersection 40.

The rear support member 50 may extend between the roof rear end 92 and the floor rear end 88. In an embodiment, the rear support member 50 may be positioned behind the seat 34. The rear support member 50 may be at least partly of a hollow cross-section. The rear support member 50 may have an upper portion 60 that may be of a hollow cross-section. The upper portion 60 is the portion of the rear support member 50 that is above the seat 34. The rear support member 50 may be designed as a component of a roll over protection system for the machine 10.

The rear support member 50 may be used as a conduit for air conditioning inside the cab 12. Specifically, the rear support member 50 may partly have a box-like structure. The rear support member 50 may include a front plate 62, a back plate 64 and opposing side plates 66 that are connected to the back plate 64 and the front plate 62, to define an air flow passage 68 (shown in FIG. 4). The front plate 62, the back plate 64 and the side plates 66 may be connected using any means known in the art, for example welding. In the embodiment as illustrated, the rear support member 50 is shown having a rectangular cross-section, however, it may be understood by a person skilled in the art that the rear support member 50 may have any other shape as suitable.

The rear support member 50 may define the air flow passage 68 along a portion of the length of the rear support member 50. Further, the rear support member 50 may define an opening 70 on the front plate 62 that fluidly connects the air flow passage 68 to an interior 72 of the cab 12. The air flow passage 68 may be connected to the air conditioning unit 58 and the opening 70 may be covered using an air filter 74 for filtering the air received from or supplied to the air conditioning unit 58. The air filter 74 may be removably disposed in the opening 70. It may be understood by a person skilled in the art that there may be a plurality of openings 70 in the cab 12 for air conditioning. The air flow passage 68 may be connected to the air conditioning unit 58 mounted on the roof 44. The air conditioning unit 58 may be any air conditioning device known in the art, for example, a fan, a condenser, heater, etc.

Further, at least the upper portion 60 of the rear support member 50 defines a rear view opening 76 to facilitate rear end visibility of the machine 10. The rear view opening 76 is a through opening extending from the front plate 62 to the back plate 64 such that the operator has a view of the back 84 of the machine 10 through the rear view opening 76. It may be understood that the rear view opening 76 is at least in the upper portion 60 to facilitate rear view of the machine 10 from the seat 34. In an embodiment, the rear view opening 76 may extend to a lower portion of the rear support member 50. In an embodiment, the rear view opening 76 may extend from the roof 44 till the floor 42.

Figure 3:
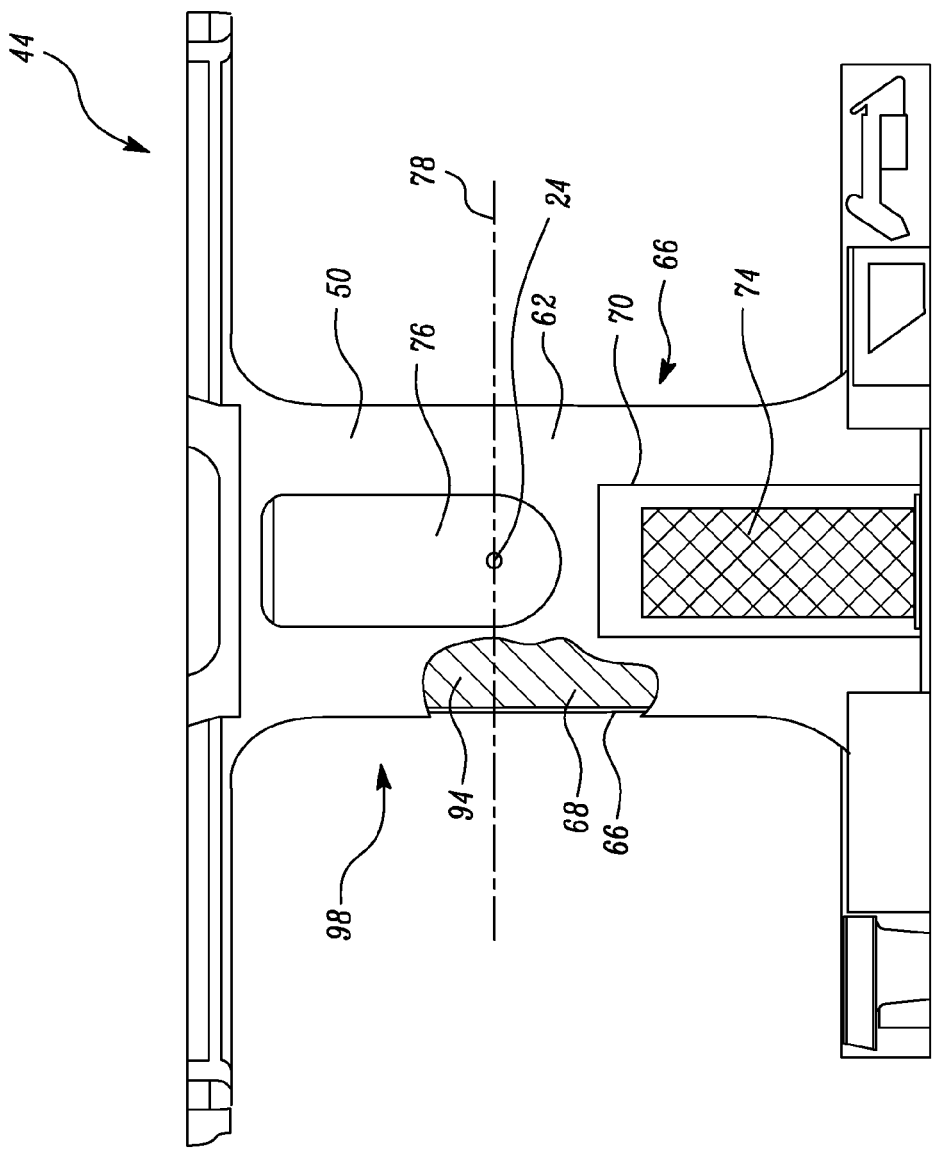
FIG. 3 illustrates a rear support member as viewed from the operator seat inside the cab.
Figure 4:
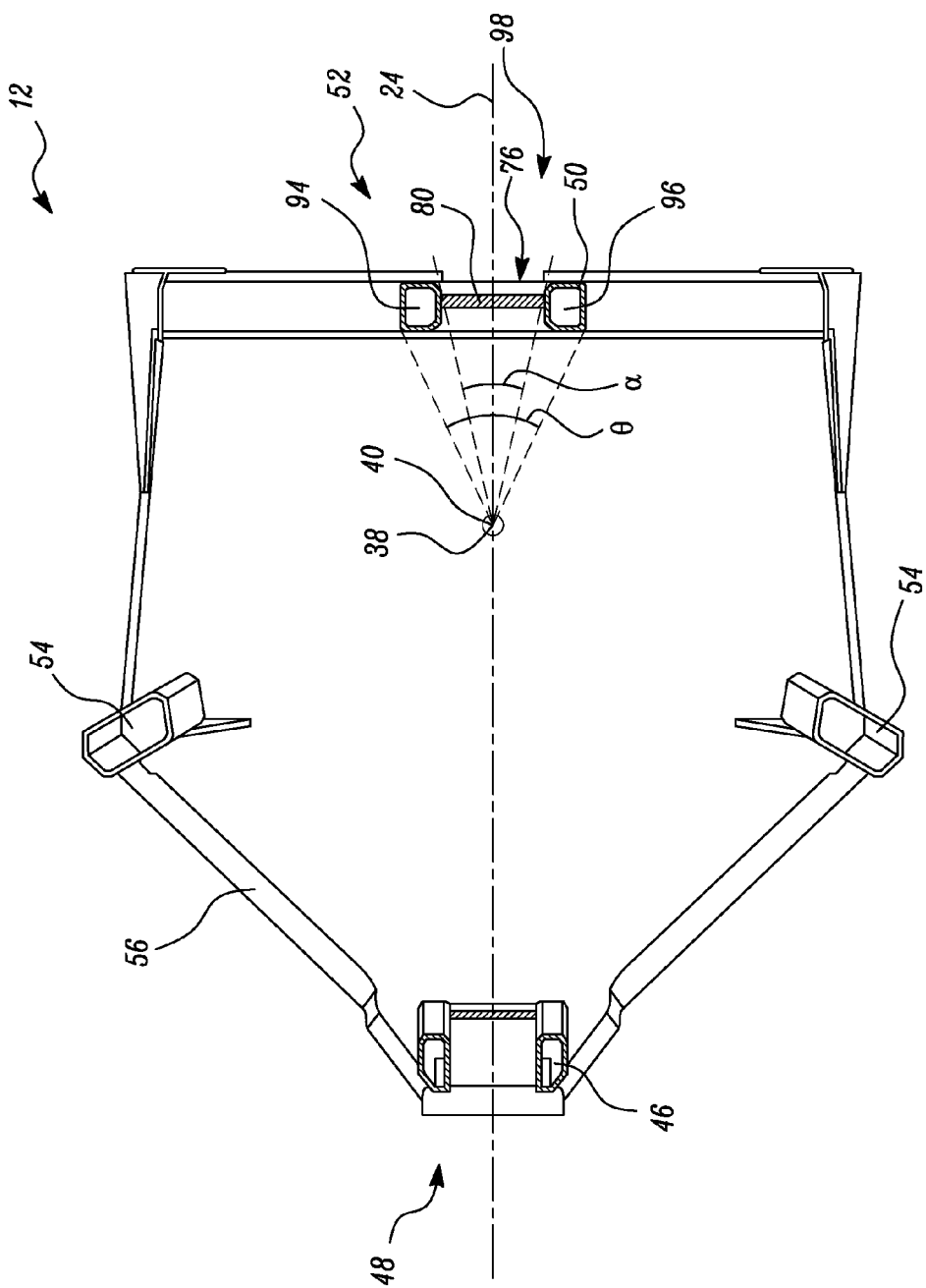
FIG. 4 illustrates a cross-section of the cab across a horizontal plane as indicated in FIG. 2.

FIG. 3 illustrates a schematic view of the upper portion 60 of the rear support member 50 as viewed from the vertical seat index axis 38. As illustrated, the rear view opening 76 may be positioned above the opening 70 on the front plate 62. FIG. 3 further illustrates a cut-away section of the front plate 62 to illustrate the air flow passage 68. The rear view opening 76 may split the air flow passage 68 into two parallel air flow passages 94 and 96 as shown in FIG. 4. As illustrated in FIG. 3, the rear support member 50 may have a split end 98 that is connected to the roof 44. The opening 70 is defined between the split end 98 of the rear support member 50.

FIG. 4 shows a cross-sectional view of the cab 12 taken through a horizontal plane 78 passing through the intersection 40 as shown in FIG. 2. As can be seen in FIG. 4, the upper portion 60 of the rear support member 50 is positioned at an angle θ relative to the intersection 40. The rear view opening 76 may be located within the rear support member 50 relative to the intersection 40 at an angle α. The rear support member 50 and the rear view opening 76 may be designed such that the parallel air flow passages 94 and 96 may have dimensions to allow adequate air flow for air conditioning inside the cab 12, and the rear view opening 76 may provide for sufficient viewing angle for unobstructed rear view of the machine 10. In an embodiment, the angle θ may extend at approximately 15-25 degrees from the longitudinal axis 24 in both lateral directions and the angle α may be between approximately 8-11 degrees from the longitudinal axis 24 in both lateral directions. The rear view opening 76 facilitates visibility for the operator towards the back 84 of the machine 10 when the operator is situated in the seat 34. The operator may also use a rear view mirror (not shown) mounted in front of the operator to view at the back 84 of the machine 10 through the rear view opening 76. The rear view opening 76 may be covered using a pane 80 or any other transparent material, for example a glass for preventing passing of dust or outside air through the rear view opening 76 inside the cab 12. It may be understood by a person skilled in the art that the rear view opening 76 as described herein may be provided in any other support member of the cab 12, for e.g. the front support member 46 and the middle support members 54.

The rear support member 50 may further be used to mount or harness any electrical wiring, coolant lines, etc. as needed. In such cases, the wirings or coolant lines may be routed on the rear support member 50 such that they do not block the rear view through the rear view opening 76. In an embodiment, the wiring or coolant lines, etc. may be positioned inside the rear support member 50.

INDUSTRIAL APPLICABILITY

The cab 12 may be applicable to any mobile machine where space constraints and operator visibility are important. The cab 12 finds particular applicability in construction and earthmoving machines having work tools, wheels, and other structure or moving parts mounted about the back 84 of the machine 10 that require close observation.

The cab having a rear support member 50 positioned behind the seat 34 may block a rear view for the operator. The cab 12 in accordance with the present disclosure may provide for a rear view to the operator for moving the machine 10 backwards. The cab 12 provides enhanced rear end visibility for the operator. The operator in the cab 12 can view the back of the machine 10 through the rear view opening 76 provided in the rear support member 50 without any undue effort while seated. The cab 12 according to the present disclosure may improve operator comfort by providing unobstructed view towards the back 84. The cab 12 may further enable the operator to precisely control the movement of the machine 10 or any implement mounted towards the back 84 of the machine 10. The rear view opening 76 in the cab 12 in accordance with the present disclosure may be provided in the rear support member 50 that is used as an air conduit for air conditioning of the cab 12. The rear view opening 76 may be designed such that the functionality of the rear support member 50 as a ROPS structure or an air conduit is maintained.

The cab 12 may have the rear support member 50 positioned at the angle θ relative to the intersection 40 along the longitudinal axis 24. The rear view opening 76 may be positioned at an angle α relative to the intersection 40 along the longitudinal axis 24. In an embodiment, the angle θ may extend at approximately 15-25 degrees from the longitudinal axis 24 in both lateral directions and the angle α may be between approximately 8-11 degrees from the longitudinal axis 24 in both lateral directions. The cab 12 as provided may have the rear support member 50 and the rear view opening 76 such that the cab 12 provides for adequate air conditioning inside the cab 12 and unobstructed rear view of the machine 10.

It will be apparent to those skilled in the art that various modifications and variations may be incorporated in the cab 12 without departing from the scope of the disclosure. It is intended that the specification and examples be considered as exemplary only, with a true scope of the disclosure being indicated by the following claims and their equivalents.

What is claimed is:

1. A cab for a machine, the machine having a longitudinal axis extending between a front of the machine and a back of the machine opposite to the front of the machine, an operator facing the front of the machine, the cab comprising:
   a roof extending generally about the longitudinal axis;
   a floor opposite to the roof and extending generally about the longitudinal axis;
   a vertical seat index axis extending through intermediate portions of the roof and the floor,
      the vertical seat index axis associated with a position of the operator disposed to face the front, and
      the vertical seat index axis perpendicularly intersecting the longitudinal axis at an intersection; and
   a plurality of support members disposed between the roof and the floor,
      the plurality of support members including a single rear support member disposed at a rear end of the cab and extending between the roof and the floor, and
      at least an upper portion of the rear support member being centrally positioned at an angle relative to the intersection along the longitudinal axis,
         wherein the upper portion of the rear support member defines a rear view opening to facilitate rear end visibility of the machine.

2. The cab of claim 1, wherein the rear support member has a hollow cross-section defining an air flow passage for air conditioning inside the cab.

3. The cab of claim 2, wherein the rear support member has an opening connecting the interior of the cab to the air flow passage.

4. The cab of claim 3, wherein an air filter is removably disposed in the opening for filtering air passing from the air flow passage.

5. The cab of claim 2, wherein an air conditioning unit is mounted on the roof and connected to the air flow passage.

6. The cab of claim 2, wherein the rear support member has a split end connected to the roof and the rear view opening is defined between the split end.

7. The cab of claim 6, wherein the rear view opening splits the air flow passage in the rear support member.

8. A cab for a machine, the machine having a longitudinal axis extending between a front of the machine and a back of the machine opposite to the front of the machine, an operator of the machine facing the front of the machine, the cab comprising:
   a roof extending generally about the longitudinal axis;
   a floor opposite to the roof, and extending generally about the longitudinal axis;
   a vertical seat index axis extending through intermediate portions of the roof and the floor,
      the vertical seat index axis associated with a position of the operator disposed to face the front of the machine, and
      the vertical seat index axis perpendicularly intersecting the longitudinal axis at an intersection; and
   a plurality of support members disposed between the roof and the floor,
      the plurality of support members include a rear support member extending between the roof and the floor and disposed at a rear end of the cab, the rear support member having a hollow cross-section defining an air flow passage for air conditioning inside the cab, at least an upper portion of the rear support member being centrally positioned behind the position of the operator,
         wherein the upper portion of the rear support member defines a rear view opening to facilitate rear end visibility of the machine.

9. The cab of claim 8, wherein the rear support member has an opening connecting the interior of the cab to the air flow passage.

10. The cab of claim 9, wherein an air filter is removably disposed in the opening for filtering air passing from the air flow passage.

11. The cab of claim 8, wherein the rear support member has a split end connected to the roof and the rear view opening is defined between the split end.

12. The cab of claim 8, wherein the rear view opening splits the air flow passage in the rear support member.

13. The cab of claim 8, wherein an air conditioning unit is mounted on the roof and connected to the air flow passage.

14. A machine comprising:
   a longitudinal axis extending between a front of the machine and a back of the machine opposite to the front of the machine,
   an operator facing the front of the machine; and
   a cab comprising:
      a roof extending generally about the longitudinal axis;
      a floor opposite to the roof and extending generally about the longitudinal axis;
      a vertical seat index axis extending through intermediate portions of the roof and the floor,
         the vertical seat index axis associated with a position of the operator disposed to face the front of the machine, and
         the vertical seat index axis perpendicularly intersecting the longitudinal axis at an intersection; and
      a plurality of support members disposed between the roof and the floor,
         the plurality of support members including a rear support member disposed at a rear end of the cab and extending between the roof and the floor,
         at least an upper portion of the rear support member being centrally positioned at an angle relative to the intersection at approximately 15-25 degrees along the longitudinal axis in both lateral directions,
            wherein the upper portion of the rear support member defines a rear view opening to facilitate rear end visibility of the machine.

15. The machine of claim 14, wherein the rear view opening is positioned at another angle relative to the intersection at approximately 8-11 degrees from the longitudinal axis in both lateral directions.

16. The machine of claim 14, wherein the rear support member has a hollow cross-section defining an air flow passage for air conditioning inside the cab.

17. The machine of claim 16, wherein the rear support member has a split end connected to the roof and the rear view opening is defined between the split end.

18. The machine of claim 16, wherein the rear support member has an opening connecting the interior of the cab to the air flow passage.

19. The machine of claim 18, wherein an air filter is removably disposed on the opening for filtering air passing from the air flow passage.

20. The machine of claim 16, wherein an air conditioning unit is mounted on the roof and connected to the air flow passage.

* * * * *